United States Patent [19]

van Roessel

[11] 4,001,502

[45] Jan. 4, 1977

[54] STRAYLIGHT COMPENSATION CIRCUIT AND BLANKING CIRCUIT FOR SAME

[75] Inventor: Frederik Johannes van Roessel, Upper Saddle River, N.J.

[73] Assignee: North American Philips Corporation, New York, N.Y.

[22] Filed: June 24, 1975

[21] Appl. No.: 589,765

Related U.S. Application Data

[63] Continuation of Ser. No. 564,732, April 3, 1975, abandoned.

[52] U.S. Cl. .................. 358/165; 178/DIG. 26; 358/171; 358/221
[51] Int. Cl.² ......................................... H04N 5/16
[58] Field of Search ............ 178/DIG. 26, DIG. 12, 178/7.2, 7.3 DC, 7.5 DC, 7.1; 358/33, 34, 36

[56] References Cited

UNITED STATES PATENTS

| | | | |
|---|---|---|---|
| 2,353,018 | 7/1944 | Duke | 178/DIG. 26 |
| 3,339,018 | 8/1967 | Brown | 178/DIG. 26 |
| 3,619,648 | 11/1971 | Wolber | 178/7.5 |
| 3,737,571 | 6/1973 | Gaebele | 178/DIG. 26 |
| 3,750,038 | 7/1973 | Meise | 178/7.3 |
| 3,860,751 | 1/1975 | Schneider | 178/DIG. 26 |

FOREIGN PATENTS OR APPLICATIONS

| | | | |
|---|---|---|---|
| 764,142 | 12/1956 | United Kingdom | 178/7.5 |
| 1,045,854 | 10/1966 | United Kingdom | 178/DIG. 26 |

*Primary Examiner*—John C. Martin
*Attorney, Agent, or Firm*—Frank R. Trifari; Henry I. Steckler

[57] ABSTRACT

A straylight compensation circuit which corrects for excessive dark current features a blanking circuit to ensure a stable black level without spikes and blanking noise. The video is integrated to provide a measure of the average picture level and is added to a reference level to compare with the blanking level in the original signal. The blanking circuit has a differential amplifier with diodes to ensure a correct and stable black level without noise or spikes.

6 Claims, 1 Drawing Figure

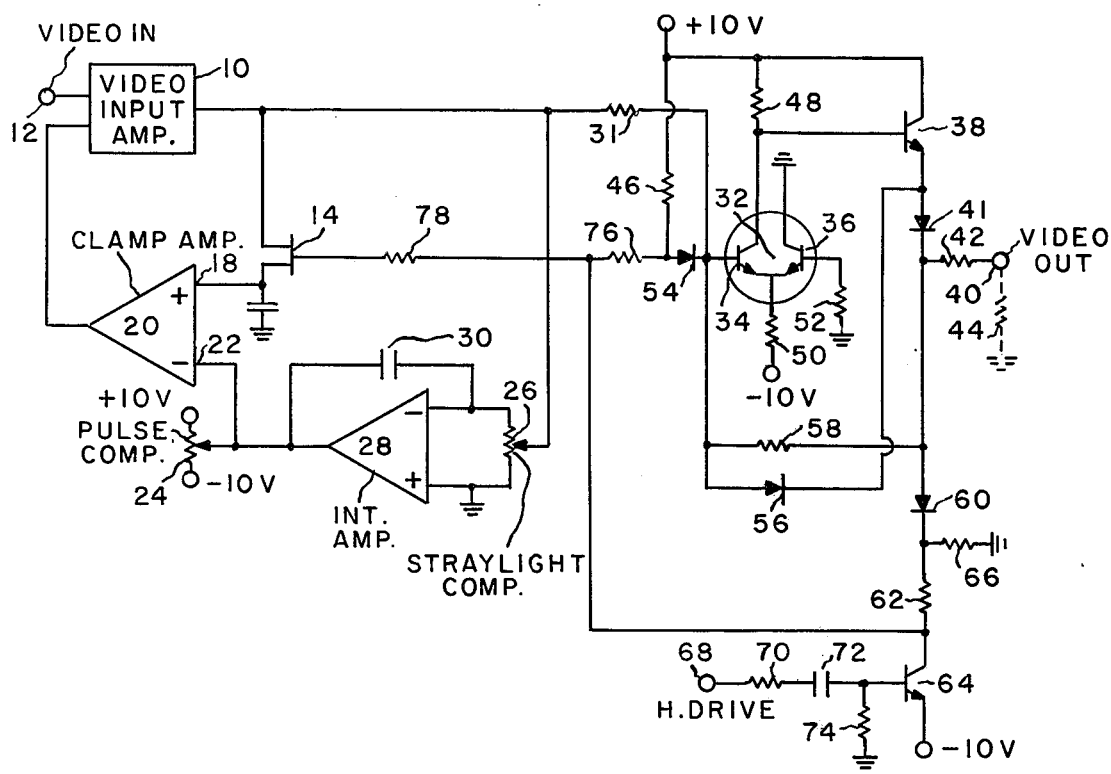

STRAYLIGHT COMPENSATION CIRCUIT AND BLANKING CIRCUIT FOR SAME

CROSS REFERENCE

This application is a continuation of application Ser. No. 564,732, filed Apr. 3, 1975, now abandoned, the priority of which is hereby claimed.

The present invention relates to blanking circuits, and more particularly, to such circuits used in straylight compensation circuits.

In a television camera, the light from the image enters the optical system where, in addition to being focused onto the camera tube target, it is partially scattered both by the air between the lenses and by the lense sidewalls, but mostly by reflection from lense surfaces. This scattered light, called "straylight" or "flare", causes a substantially uniform illumination of the camera tube target, which in turn causes the video output signal from the tube to have a straylight D.C. bias voltage component. It is therefore necessary to remove it and set the video signal to the correct D.C. level in order to be able to accurately further process the video signal. After removing the straylight component, it is necessary to blank and properly insert blanking pulses into the video signal. Previous blanking circuits, which typically use an FET, have problems with the blanking pulse, which is applied to the gate electrode of the FET, appearing in the video output signal as a spike signal.

It is therefore an object of the present invention to provide a blanking circuit that does not produce spike signals in the output waveform.

It is another object to provide a blanking that is stable.

It is a further object to provide a blanking circuit that removes any noise that may be present during the blanking interval.

It is a still further object to provide a straylight compensation circuit that incorporates said blanking circuit.

In brief, these and other objects are achieved by having a blanking circuit with a differential amplifier. Various diodes ensure that the black level is stable and blanking noise and spikes are eliminated. The straylight circuit has an integrator and a clamp to set the black level.

These and other objects, features, and advantages, will become apparent from the following description when taken in conjunction with the drawing in which:

The FIGURE is a partially schematic, partially block, diagram of the invention.

In the FIGURE there is shown a video input amplifier 10, which can be a differential amplifier, that receives a video signal at input 12 that is about 0.7 volts positive modulation and has a real black level that differs from zero volts due to straylight and A.C. coupling. The signal is amplified and inverted by amplifier 10, which has a low output impedance. During the blanking interval, the amplified signal is sampled by junction FET transistor 14 that receives a sampling signal at its gate. The sampled signal is stored by capacitor 16 and applied to noninverting input 18 of clamp amplifier 20. Amplifier 20 has a response time equivalent to that of several video lines to avoid 1/f noise. The inverting input 22 receives an adjustable voltage from a variable pulse compensation potentionmeter 24. The output signal from amplifier 10 is also applied to straylight compensation potentiometer 26 which in turn is coupled to the inverting input of amplifier 28. Because of capacitor 30, amplifier 28 is an integrator, and therefore applies to input 22 a D.C. signal in accordance with the average value of the amplifier 10 output signal, which is a measure of the straylight present in the signal.

Amplifier 20 applies a D.C. signal to an input of amplifier 10 that is a function of the difference voltage between inputs 18 and 22. At input 18 it receives the original blanking level, and at input 22 the adjustable bias voltage from the potentiometer 24 and the output voltage of amplifier 28. Thus potentiometer 24 is adjusted until the nominal black level at the output of amplifier 10 is at zero volts with the lense capped so that there is no straylight and therefore no straylight correction signal from amplifier 28. However, because of the straylight, when the cap is removed, the real black level in the video signal is not at zero volts, but at some other value. Since, amplifier 28 also applies to input 22 a D.C. value in accordance with the straylight, the real black level will be set to zero volts, thus compensating for the straylight. The amount of the compensation is determined by potentiometer 26 in accordance with the amount of straylight present.

In order to maintain the change in the black level in the subsequent video processing amplifiers, which may be A.C. coupled, it is essential to blank the video after the D.C. has been added. For this purpose a video output amplifier is provided, which substitutes during blanking, a blanking level, which is at ground potential. The negative modulation video output signal from amplifier 10 is applied through resistor 31 to differential amplifier 32 comprising transistors 34 and 36, which are matched to maintain the D.C. reference level, and then to emitter follower transistor 38. Since transistor 34 inverts the signal, while transistor 38 does not, the video at output terminal 40 has positive modulation.

The signal is applied to output terminal 40 through diode 41 and a 75 ohm matching resistor 42, which is terminated, through a length of coaxial cable, by another 75 ohm matching resistor 44, shown in dotted lines since it is part of a subsequent unit. Resistor 44 provides a D.C. return for the present invention. D.C. voltage is applied to the various electrodes of amplifier 32 by resistors 46, 48, 50 and 52 and diode 54. A diode 56 is connected from the emitter of transistor 38 to the base of transistor 34, while a feedback resistor 58 is connected from resistor 42 to said base. A diode 60 goes from resistor 42 to resistor 62, which in turn goes to the collector of transistor 64. A resistor 66 shunts diode 60 to ground. A terminal 68 receives negative horizontal drive pulses and applies them through resistor 70 and capacitor 72 to the base of transistor 64, which is shunted by resistor 74. The pulses are applied from the collector of transistor 64 through resistor 76 to diode 54 and through resistor 78 to the gate of transistor 14.

During the blanking time, a negative going blanking pulse is applied to terminal 68 which cuts off transistor 64. Therefore there is no current through resistors 62, 42, and 44, and thus since resistor 44 is connected to ground, resistor 42 is at ground potential, as is the cathode of diode 41. Clearly, diode 41 will then block from the output terminal 40 any signal at the emitter of transistor 38 that is lower than ground potential. An extra current to the base of transistor 34 is provided during blanking by resistor 46 and diode 54. This causes the voltage at the collector of transistor 34, the base and emitter of transistor 38, and the anode of diode 41 to go lower than ground. Hence diode 41 clips the blanking portion below the ground potential, and therefore, eliminates the original signal during the blanking interval including any noise present during the blanking interval. Therefore the clipping action is exactly at the black level, during the blanking time.

During the video signal portion transistor 64 conducts and draws current through resistor 62. In addition, the bias current through resistor 46 is diverted from the diode 54, and flows through resistor 76 and transistor 64 to the minus 10 volts source. This forward biases diodes 60 and 41, lowering the clipping level to slightly below black level. Therefore, if the actual signal is at black level, no clipping action will take place. The video signal is then amplified by a factor of two to compensate for losses in resistors 42 and 44. The amplification is determined by the ratio of resistors 58 and 31. The amplification is linearized for the non-linear characteristic of diode 41 by the feedback resistor 58. Diode 56 closes the feedback loop during clipping, since otherwise transistor 34 would saturate and there would be a slow recovery. In addition, the base of transistor 34 would not remain at virtual ground, which would cause a feedforward signal to flow through resistor 58 during clipping.

The present invention is located after the camera video preamplifiers so that the video signal is relatively high, but before the white clippers, since the white highlights are part of the straylight that must be compensated. It is also before any video matrixing, since it is more difficult to compensate for straylight, after at that point. This normally leaves as a location for the present invention after the preamplifiers and before any variable gain stage.

It will be appreciated that many other embodiments are possible without departing from the spirit and scope of the invention.

What is claimed is:

1. A blanking circuit for a video signal having video and blanking portions, said circuit comprising an inverting amplifier having an input means for receiving said signal and an output; an output terminal; a first diode coupled between said output terminal and said amplifier output, means for providing feedback coupled between said diode and said amplifier input means; means for maintaining said feedback during said blanking portion coupled between said diode and said amplifier input, and means coupled to said diode and having input means for receiving a blanking signal for biassing said diode to clip said signal at a reference potential during the blanking portion and for biassing said diode at some other potential during the video portion.

2. A circuit as claimed in claim 1 wherein said amplifier comprises a differential amplifier and an emitter follower coupled thereto.

3. A circuit as claimed in claim 1 wherein said amplifier biassing means comprises a second diode coupled to said amplifier input.

4. A circuit as claimed in claim 1 further comprising means for sampling said video signal, means for integrating said video signal, means for comparing said sampled and integrated video signals having an input means for receiving said video signal and an output coupled to said amplifier input, and means for clamping said video signal in accordance with the difference thereof.

5. A circuit as claimed in claim 1 wherein said feedback means comprises a resistor.

6. A circuit as claimed in claim 1 wherein said maintaining means comprises a third diode.

* * * * *

UNITED STATES PATENT AND TRADEMARK OFFICE
CERTIFICATE OF CORRECTION

PATENT NO. : 4,001,502
DATED : January 4, 1977
INVENTOR(S) : Frederik Johannes van Roessel It is certified that error appears in the above—identified patent and that said Letters Patent is hereby corrected as shown below:

The Drawing Figure should appear as shown below:

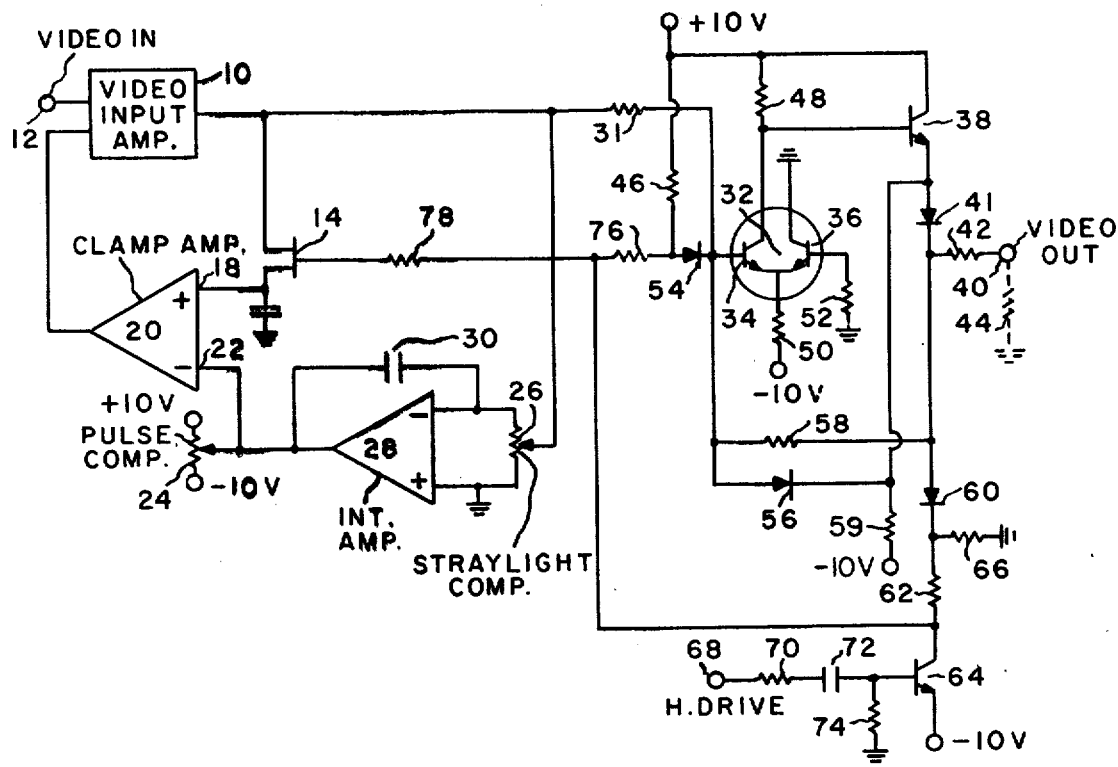

UNITED STATES PATENT OFFICE
CERTIFICATE OF CORRECTION

Patent No. 4,001,502    Dated January 4, 1977

Inventor(s) Frederik Johannes van Roessel

It is certified that error appears in the above-identified patent and that said Letters Patent are hereby corrected as shown below:

Col. 2, line 49, After "base." insert
-- The emitter of transistor 38 is further connected via a resistor 59 to the minus 10 volt D.C. source. --

Signed and Sealed this

Fourth Day of August 1981

[SEAL]

Attest:

Attesting Officer

GERALD J. MOSSINGHOFF

Commissioner of Patents and Trademarks